UNITED STATES PATENT OFFICE.

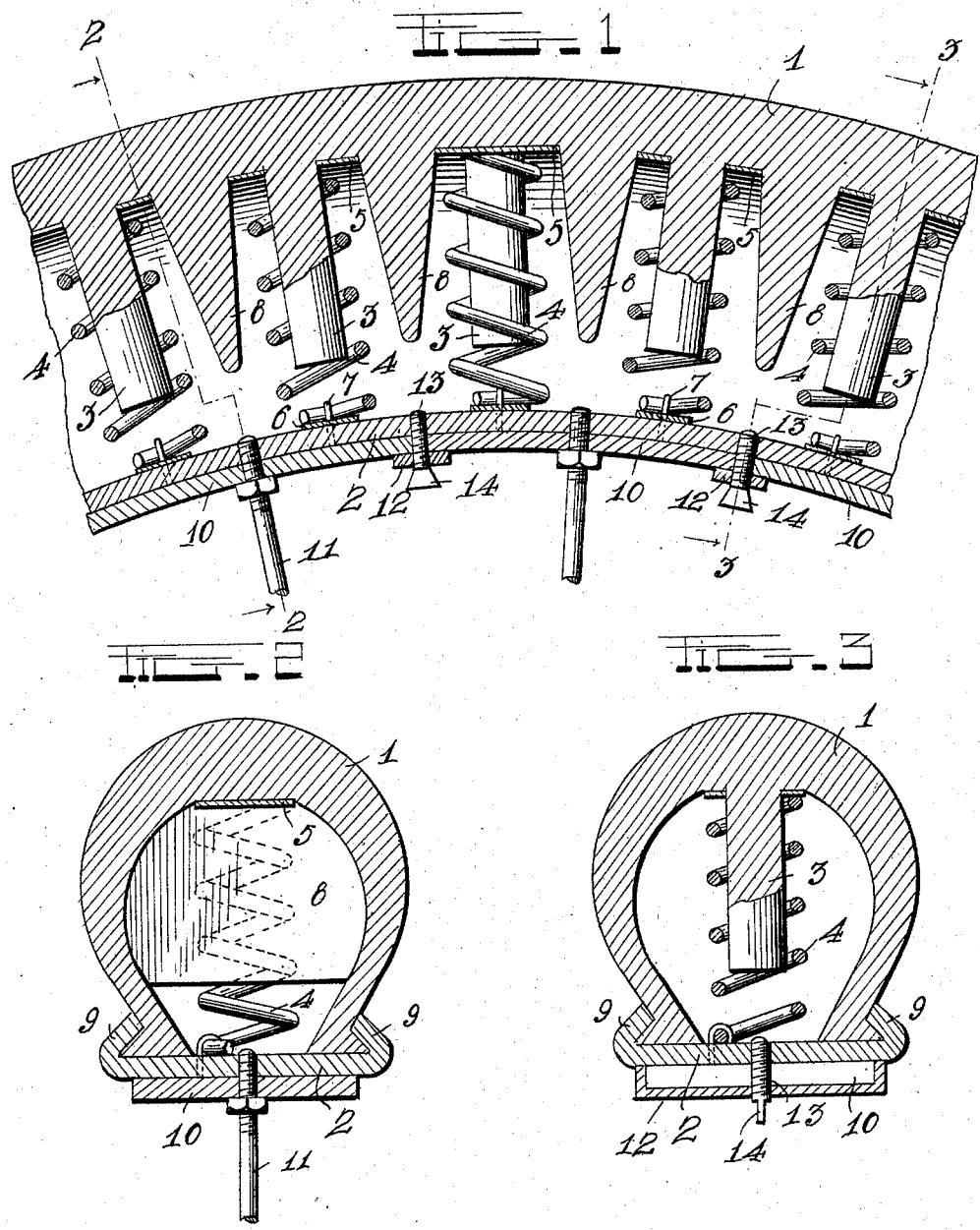

LEO L. SAVOIE, OF NEW ORLEANS, LOUISIANA.

CUSHION-TIRE FOR VEHICLE-WHEELS.

967,065.            Specification of Letters Patent.        Patented Aug. 9, 1910.

Application filed March 28, 1910. Serial No. 552,066.

*To all whom it may concern:*

Be it known that I, LEO L. SAVOIE, a citizen of the United States, residing at New Orleans, in the parish of Orleans and State of Louisiana, have invented certain new and useful Improvements in Cushion-Tires for Vehicle-Wheels; and I do declare the following to be a full, clear, and exact description of the invention, such as will enable others skilled in the art to which it appertains to make and use the same.

This invention relates to improvements in cushion tires for vehicle wheels.

One object of the invention is to provide an improved construction of cushion tire having the resiliency and other advantages of a pneumatic tire without the disadvantages possessed by the latter.

Another object is to provide a tire of this character which will be simple, strong and durable in construction, efficient and reliable in operation and well adapted to the purpose for which it is designed.

With the foregoing and other objects in view, the invention consists of certain novel features of construction, combination and arrangement of parts, as will be more fully described and particularly pointed out in the appended claims.

In the accompanying drawings, Figure 1 is a vertical longitudinal section of a portion of a wheel and tire constructed in accordance with my invention; Fig. 2 is a cross sectional view on the line 2—2 of Fig. 1; Fig. 3 is a similar view on the line 3—3 of Fig. 1.

By reference to the accompanying drawings, it will be seen that my improved tire comprises a flexible tube or casing 1, the inner edges of which are adapted to be engaged with the outer rim 2 of the wheel in any suitable manner. The outer or tread portion of the tire 1 is of considerably greater thickness than the side portions thereof, as clearly shown in the drawings. On the inner wall of the thicker or tread portion of the tire is formed a series of inwardly projecting spring holding studs 3, with each of which is engaged a coiled spring 4. The outer ends of the springs 4 engage a metal washer plate or strip 5 which is arranged around the inner wall of the tread portion of the tire while the inner ends of the springs are engaged with washers 6 and are secured to the rim 2 of the wheel by clips 7 or other suitable fastening devices.

On the inner wall of the tread portion of the tire is also formed a series of inwardly projecting spacing webs 8, which are arranged laterally with the studs 3 and are preferably tapered at their inner or free edges as shown. These webs form strengthening or reinforcing members for the tire collapse. The webs 8 and studs 3 are preferably formed from the same material of which the tire is formed and are constructed integrally therewith and project into the tire a suitable distance as shown. The rim 2 of the wheel may be of any suitable construction and is formed in the present instance of metal and has on its edges clenching flanges 9 whereby the edges of the tire are secured thereto. The outer metal rim 2 is engaged with the inner wooden rim 10 of the wheel, said wooden rim being preferably formed in a series of segmental sections with each of which midway between its ends is engaged the outer end of one of the spokes 11 of the wheel. The ends of the spokes are threaded and project through apertures in the rim sections and on said threaded ends of the spokes are arranged nuts which are screwed up into engagement with the rim sections as shown.

The sections of the rim 10 are held in place and in operative engagement with the outer rim 2 by a series of channel iron clamping plates 12 which are engaged with the adjacent ends of the sections. The plates 12 are provided with centrally disposed bolt holes with which are engaged clamping screws 13 the inner ends of which are screwed into engagement with threaded bolt holes in the outer metal rim 2 thereby securely fastening the plates 12 and clamping the sections of the rim 10 in place. The screws 13 pass between the ends of the sections of the rim 10 and on the outer end of the screws are formed heads 14 whereby they may be turned by hand or with a wrench. By forming the inner rim 10 in sections and fastening said sections in the manner described any of the sections may be readily removed to permit the removal and replacing of a spoke or for any other purpose.

From the foregoing description, taken in connection with the accompanying drawings, the construction and operation of the invention will be readily understood without requiring a more extended explanation.

Various changes in the form, proportion and the minor details of the construction may be resorted to without departing from the principle or sacrificing any of the advantages of the invention as defined in the appended claims.

Having thus described my invention, what I claim is:—

1. In a tire of the class described comprising a tube or casing having a series of spring holding studs formed on the inner walls of the tread surface thereof and projecting into said tire, a series of springs engaged with said studs and supporting the tread of the tire in operative position on the rim of the wheel, and flexible webs arranged between said studs.

2. In a vehicle tire a casing, a series of springs carrying studs depending from the inner wall of the tread surface thereof and projecting into said tire a series of coiled springs encircling said studs, a series of spacing webs depending from the inner wall of said tread surface between said studs and each connected to the opposite side walls of said casing, the free ends of said webs and studs extending beyond the center of the tire and spaced from the rim of the wheel when applied.

3. In a vehicle tire a casing, the tube having a thickened tread surface, a series of studs formed integral with said tread surface, and extending into the tire, a series of coiled springs arranged on said studs, means for securing the inner ends of said springs to the inner end of the wall and a series of plates, webs depending from the inner face of said tread surface between said studs, said webs being formed of flexible material and wedge-shaped in cross section and tapering inwardly toward their free edges.

In testimony whereof I have hereunto set my hand in presence of two subscribing witnesses.

LEO L. SAVOIE.

Witnesses:
J. P. BALDWIN,
LOUIS G. FONT.